US008307230B2

(12) United States Patent
Hughes

(10) Patent No.: US 8,307,230 B2
(45) Date of Patent: Nov. 6, 2012

(54) METHODS FOR MANAGING PROCESS ACTIVITY DATA USING A SYSTEM-WIDE DAEMON

(75) Inventor: Richard Hughes, London (GB)

(73) Assignee: Red Hat, Inc., Raleigh, NC (US)

( * ) Notice: Subject to any disclaimer, the term of this patent is extended or adjusted under 35 U.S.C. 154(b) by 572 days.

(21) Appl. No.: 12/551,158

(22) Filed: Aug. 31, 2009

(65) Prior Publication Data

US 2011/0055607 A1    Mar. 3, 2011

(51) Int. Cl.
    *G06F 1/32*    (2006.01)
(52) U.S. Cl. .................. 713/323; 713/340; 715/764
(58) Field of Classification Search .......... 710/305–306; 713/300–340; 715/765
    See application file for complete search history.

(56) References Cited

U.S. PATENT DOCUMENTS

| 5,560,022 A * | 9/1996 | Dunstan et al. .......... 713/300 |
| 5,564,015 A * | 10/1996 | Bunnell .................. 714/47.2 |
| 6,131,131 A * | 10/2000 | Bassman et al. ........... 710/15 |
| 7,197,587 B2 * | 3/2007 | Chheda et al. ............ 710/262 |
| 7,363,406 B2 * | 4/2008 | Chai et al. .............. 710/244 |
| 2009/0210726 A1 * | 8/2009 | Song et al. ............. 713/300 |

OTHER PUBLICATIONS

"Fedora 11 Installation Guide: Installing Fedora 11 on x86, AMD64, and Intel® 64 architectures," Ed. 1.0, Fedora Documentation Project, fedora-docs-list@redhat.com, Red Hat, Inc. and others, 2009, 274 pages.
"Fedora 11 User Guide: Using Fedora 11 for common desktop computing tasks," Ed. 1.0, Fedora Documentation Project, fedora-docs-list@redhat.com, Red Hat, Inc. and others, 2009, 118 pages.

* cited by examiner

*Primary Examiner* — Brian Misiura
*Assistant Examiner* — Kim Huynh
(74) *Attorney, Agent, or Firm* — Lowenstein Sandler PC

(57) ABSTRACT

Techniques for managing process activity statistics using a system-wide daemon are described herein. A power management daemon retrieves process activity status data from a system monitoring file stored within a data processing system, in response to a request received from a session client via an application programming interface (API). The power management daemon is a single system-wide component within the data processing system to provide the process activity status data to a plurality of session clients. The retrieved process activity status data is returned to the client via the API, where the system monitoring file requires a predetermined accessing privilege for accessing. Thus, through the power management daemon, the session client does not have to satisfy the predetermined accessing privilege in order to access the process activity status data stored in the system monitoring file.

18 Claims, 4 Drawing Sheets

METHODS FOR MANAGING PROCESS ACTIVITY DATA USING A SYSTEM-WIDE DAEMON

TECHNICAL FIELD

The present invention relates generally to power management. More particularly, this invention relates to managing process activity data using a system-wide daemon.

BACKGROUND

When a session or system process is running, a processor (e.g., a central processing unit or CPU) is also running at a higher rate (e.g., 100%), consuming significant power. If some processes go to sleep, then the processor can return back to low frequency and voltage states (e.g., P and C states), which saves significant power (e.g., 50-90%) on laptop, desktop and server computer systems. By monitoring what processes are waking up (and causing the processor to also return to full power mode) over a period of time, one can identify which processes are waking up most frequently and correct such problems as needed in order to reduce power consumption.

Typically, the kernel of an operating system (OS) only exports certain system activities in a file, such as /proc/interrupts for kernel interrupts and /proc/timer_stats for user space interrupts. When these files are read, new values are calculated and the values are returned to the user space as the number of wakeups associated with a process or kernel identifier (ID).

Unfortunately, the user space tracing has a measurable cost (in power and latency). It requires a user running at a root level (e.g., as a power user or administrator) to enable this tracing functionality, and then disable it when the user has finished monitoring the process wakeup activities. If more than one application enables and disables the logging, then one instance may prevent another instance from working correctly. While this may be acceptable on a single-user system with full root access, it is not suitable for a multi-user workstation.

BRIEF DESCRIPTION OF THE DRAWINGS

The present invention is illustrated by way of example and not limitation in the figures of the accompanying drawings in which like references indicate similar elements.

DETAILED DESCRIPTION

In the following description, numerous details are set forth to provide a more thorough explanation of the embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

According to certain embodiments of the invention, instead of having only one user space application with a certain accessing privilege such as a root accessing privilege to access the process activity data such as wakeup activity data, a system-wide power management daemon (e.g., as part of an operating system) is maintained and configured to provide an API to allow multiple user space applications to access the process activity data without requiring the applications to have the required root accessing privilege.

By making the process activity statistics available to software developers (and not just administrators with the root password) power-users and developers can become aware of the power "cost" of a process having certain activities (e.g., wakeup activities). Throughout this application, a wakeup activity is utilized as an example of process activities. However, it is not so limited, other types of process activities may also be applied herein.

The user-space and kernel wakeups can be used as a session power management policy input. This would allow tasks to be scheduled only when the computer is idle, or more usefully to warn users and/or developers when idle applications are performing many wakeups and consuming too much of power. This would also be useful to identify computers that are part of a cluster or part of virtual servers with many idle wakeups, so that tasks may be disabled or moved from one instance from another, or to notify the administrator.

Figure 1:
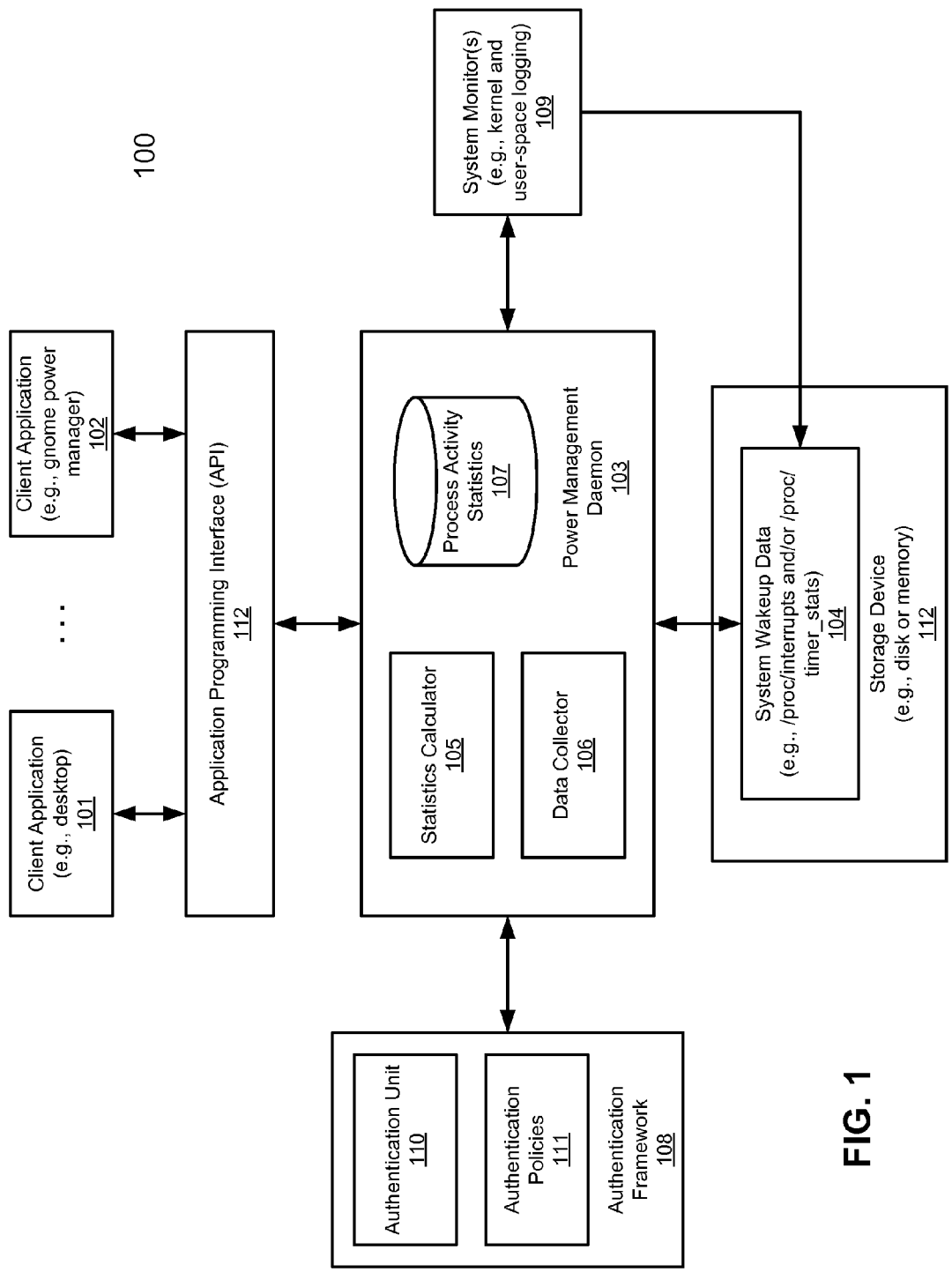
FIG. 1 is a block diagram illustrating a power management system according to one embodiment.

FIG. 1 is a block diagram illustrating an example of a power management system according to one embodiment of the invention. For example, system 100 may be part of a portable computer or portable electronic device (e.g., media player). Referring to FIG. 1, system 100 includes, but is not limited to, one or more session clients 101-102 (e.g., client applications) communicatively coupled to a power management daemon 103 to obtain certain process wakeup statistic data via API 112. The power management daemon is configured to access one or more system wakeup data files 104 to retrieve certain data regarding wakeup events of one or more processes and to compute the wakeup statistic data accordingly. The data files 104 may be stored in a storage device 112. Storage device 112 may be a non-volatile memory device such as a disk or a volatile memory such as a random-access memory (RAM) device.

Specifically, according to one embodiment, power management daemon 103 includes a wakeup statistics and/or profile calculator 105, a data collector 106, and a wakeup statistics and/or profile repository or database 107.

According to one embodiment, data collector 106 is configured to access the file 104 to collect process wakeup data. The data that is collected is the process ID (PID) and the number of wakeups the process has done since it started. The current reading is taken away from the last reading and divided by the poll interval to give a floating point representation of the number of wakeups per second. The current reading is then saved as the "last" reading. If this PID has been started since the last polling interval then it is then processed so the PID is given a more familiar command description (e.g. converting PID 54662 to "/usr/bin/gedit")—this is only done once and cached as it is quite a computationally expensive operation. The data is also labeled as either "user space" or "kernel space" using a boolean flag. The process wakeup data may be exported into file 104 by one or more system monitors 109 such as a user-space logging unit and/or a kernel logging unit as part of an operating system. The wakeup statistics/profile calculator 105 is configured to compute process wakeup statistics and/or profile in view of the process wakeup activity data collected by data collector 105 and store the information in database 107.

Typically, file 104 is maintained in a certain location of system 100 that requires a user/client to have a certain accessing privilege (e.g., root accessing privilege) in order to access file 104. For example, in a Linux operating environment, file 104 may be a part of /proc/interrupts and/or /proc/timer_stats files. By using system wide power management daemon 103 and API 112, content of file 104 can be exposed to multiple clients 101-102 without requiring clients 101-102 to have the required accessing privilege. In addition, by using system wide power management daemon 103 and API 112, multiple clients can substantially concurrently access contents of file 104 as well we data stored in database 107.

Figure 2:
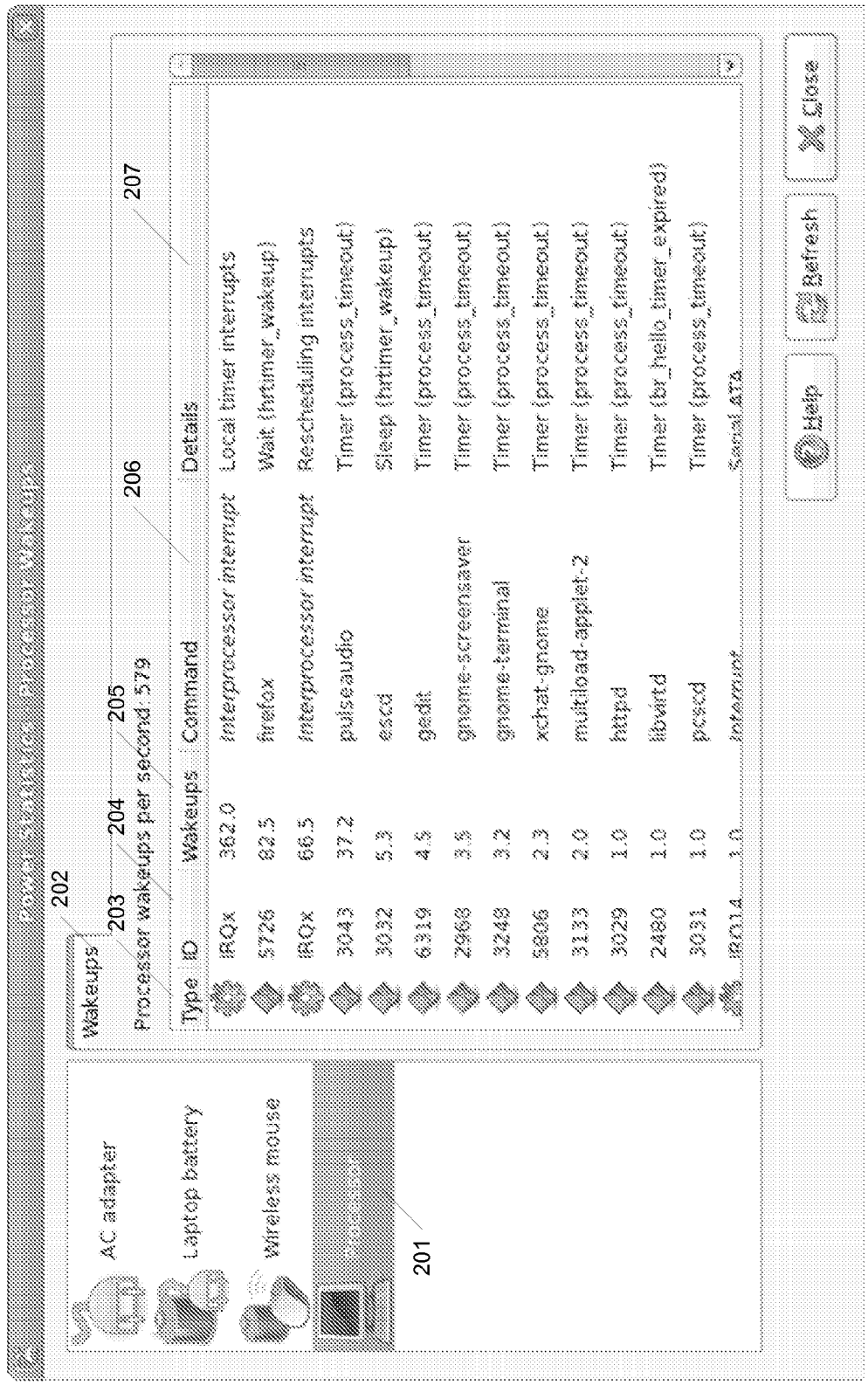
FIG. 2 is a screenshot displaying processor wakeup statistics according to some embodiments.

The calculated wakeup statistics and/or profile data may be used by clients 101-102 to determine and/or present to a user wakeup statistics of one or more processes running within system 100. Alternatively, such data may also be used by a power manager client (e.g., gnome power manager in a Linux environment) to construct and present more complicated process operating statuses to users, such as, for example, those as shown in FIG. 2, including identifying how many wakeups caused by which processes, etc.

Thus, by having a single daemon controlling the kernel and user space monitoring files (e.g., /proc/interrupts and/or /proc/timer_stats files in a Linux environment), there is a single process generating the statistics and enabling/disabling access to the user space profiling. For example, in a Linux operating environment, power management daemon 103 may be implemented as a component of a hardware abstract layer (HAL) of an operating system or as a separate daemon such as DeviceKit-power in a Linux operating environment. In addition, the API 112 allows multiple session clients or users to query the statistics data generated by the power management daemon 103—applications can easily query for a set of data listing each application and the average wakeups per second (and the type, userspace/kernelspace) without having to keep a large amount of data and poll the interfaces themselves. This data is ready-formatted to allow easy display to the end user, for instance, displaying the command line string rather than the PID number. without querying the kernel or recalculating the statistics individually. In one embodiment, clients 101-102 may work on a cached copy of the data cached by the power management daemon 103. A user session does not have to have a high accessing privilege such as a "root" privilege to access such data, because the power management daemon 103 takes care of such a requirement.

In addition, according to one embodiment, power management daemon 103 may invoke an authentication framework 108 to control whether a particular client can access the statistics data. The authentication framework 108 may be part of an operating system. For example, when a session client or client application attempts to access the statistics data, power management daemon 103 invokes the authentication framework 108, where the authentication unit 110 is configured to authenticate the client based on the authentication policies 111. As a result, power management daemon can prevent a client (e.g., a logged-in user) from accessing the statistics data when such a client should not have a privilege to do so.

Further, according to one embodiment, implementing this control in one central place also has the advantage in which the kernel space and user space logging performed by system monitor 109 can be enabled only when a client is requesting the statistics data (e.g., based on a command received via API 112). As soon as the client stops requesting the data (e.g., based a command received via API 112), such a logging can be disabled. That is, the user space and kernel space logging by system monitor 109 can be enabled and/or disabled in response to a client request (e.g., on demand manner), which may further reduce power consumption.

According to another embodiment, power management daemon 103 is configured to keep track the number of clients that are currently requesting the statistics data. For example, power management daemon 103 utilizes a reference count (not shown) indicating how many clients are currently logged in. Thus, when a new client logs in or starts requesting data via API 112, the reference count is incremented and similarly, the reference count is decremented when a client logs off or stops requesting data via API 112. According to one embodiment, the user space and/or kernel space logging performed by system monitor 109 is enabled when there is at least one client currently requesting data and the logging is disabled when no more client is currently requesting data. Note some or all of the components as shown in FIG. 1 can be implemented in software, hardware, or a combination of both.

FIG. 2 is a screenshot illustrating a GUI presented by an application according to one embodiment of the invention. For example, the GUI as shown in FIG. 2 may be presented by client 102 of FIG. 1 such as a gnome power management utility in a Linux operating environment. Referring to FIG. 2, according to one embodiment, this GUI can be used to display a variety of power statistics of a data processing system such as system 100 of FIG. 1. In this example, the process wakeup statistics 202 associated with processor 201 are displayed. Each process is identified by a process identifier (PID) 203. In addition, the number of wakeups 205 is caused by the associated process, as well as the command 206 that causes the wakup and detailed information 207 regarding the process. The power statistics data may be obtained or computed through the power management daemon such as power management daemon 103 of FIG. 1. Note that the GUI as shown in FIG. 2 is described for illustration purpose only; other formats and more or fewer data may be displayed.

Figure 3:
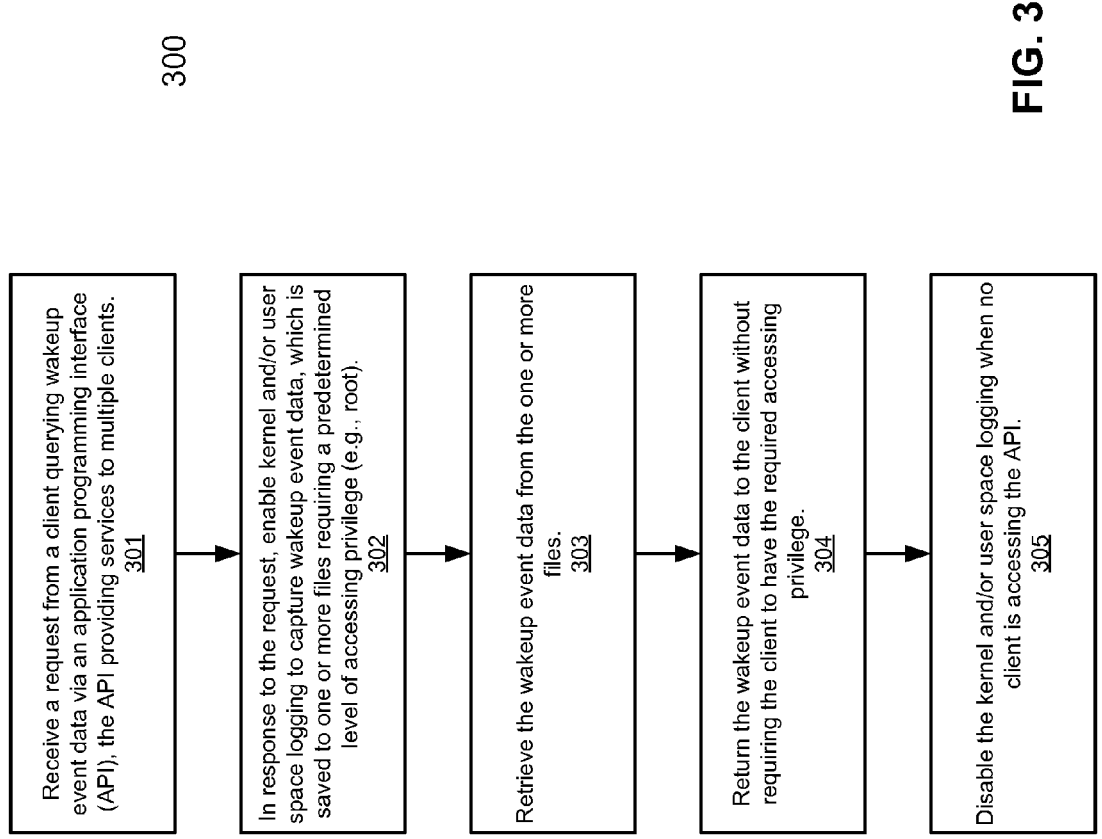
FIG. 3 is a flow diagram illustrating a method for managing processor wakeup statistics according to one embodiment.

FIG. 3 is a flow diagram illustrating a method for managing process wakeup statistics and/or profile according to one embodiment of the invention. Note that method 300 may be performed by processing logic which may include software, hardware, or a combination of both. For example, method 300 may be performed by power management daemon 103 of FIG. 1. Referring to FIG. 3, at block 301, a request for querying power management related statistics data (e.g., process wakeup data) is received from a client via an API. The API is designed to provide an interface to multiple clients for accessing such data. In response to the request, processing logic enables the kernel logging and user space logging, where the logging will be recorded in one or more files that require a predetermined level of accessing privilege such as a "root" accessing privilege. In particular, if the client is the first client to access through the API, the power management daemon is configured to communicate with a system monitor to enable the kernel and user space logging, where the output of the logging is saved to a file that a normal user would not have the required privilege to access. At block 303, the data output and exported from the kernel and user space logging is retrieved from the file and at block 304, the data is returned to the client. As a result, even without the required accessing privilege, the client can obtain the data using the system-wide power management daemon. At block 305, the kernel and user space logging is disabled when no client is currently accessing the power management daemon. Other operations may also be performed.

Figure 4:
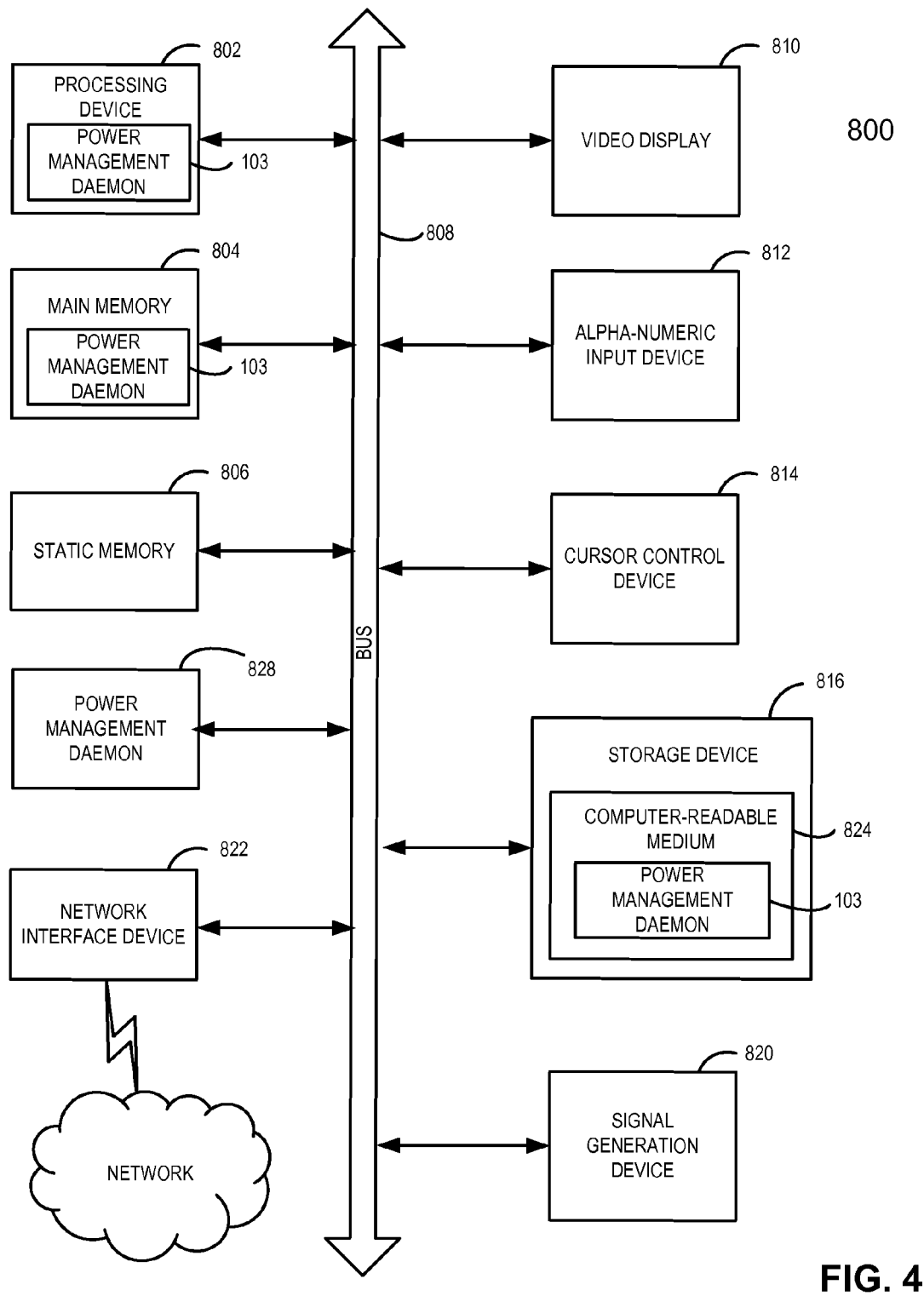
FIG. 4 is a block diagram illustrating a data processing system according to one embodiment.

FIG. 4 illustrates a diagrammatic representation of a machine in the exemplary form of a computer system 800 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 800 includes a processing device 802, a main memory 804 (e.g., read-only memory (ROM), flash memory, dynamic random access memory (DRAM) such as synchronous DRAM (SDRAM), etc.), a static memory 806 (e.g., flash memory, static random access memory (SRAM), etc.), and a data storage device 816, which communicate with each other via a bus 808.

Processing device 802 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 is configured to execute the instructions 103 for performing the operations and steps discussed herein.

The computer system 800 may further include a network interface device 822. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 820 (e.g., a speaker).

The data storage device 816 may include a computer-accessible storage medium 824 (also known as a machine-readable storage medium or a computer-readable medium) on which is stored one or more sets of instructions or software (e.g., power management daemon 103) embodying any one or more of the methodologies or functions described herein. The power management daemon 103 may also reside, completely or at least partially, within the main memory 804 and/or within the processing device 802 during execution thereof by the computer system 800, the main memory 804 and the processing device 802 also constituting machine-accessible storage media. The power management daemon 103 may further be transmitted or received over a network via the network interface device 822.

The computer-readable storage medium 824 may also be used to store the power management daemon 103 persistently. While the computer-readable storage medium 824 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The modules 828, components and other features described herein can be implemented as discrete hardware components or integrated in the functionality of hardware components such as ASICS, FPGAs, DSPs or similar devices. In addition, the modules 828 can be implemented as firmware or functional circuitry within hardware devices. Further, the modules 828 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "retrieving" or "returning" or "computing" or "enabling" or "disabling" or "maintaining" or "incrementing" or "decrementing" or "invoking" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable medium. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of embodiments of the invention as set forth in the following claims. The specification and drawings are, accordingly, to be regarded in an illustrative sense rather than a restrictive sense.

What is claimed is:

1. A computer-implemented method, comprising:
   retrieving, by a power management daemon, process activity status data from a system monitoring file stored within a data processing system, in response to a request received from a session client, the power management daemon being a system-wide component within the data processing system; and
   returning, by the power management daemon, the retrieved process activity status data to the client, wherein the system monitoring file requires a predetermined accessing privilege for accessing, and wherein the session client receives the process activity status data without having to satisfy the predetermined accessing privilege.

2. The method of claim 1, further comprising:
   computing, by the power management daemon, process wakeup statistics based on the process activity status data, including a number of wakeup events within a predetermined period of time caused by one or more processes running within the data processing system; and
   returning the computed statistics to the client via via an application programming interface (API).

3. The method of claim 2, further comprising:
   enabling system logging performed by a system monitor of the data processing system in response to the request if the session client is the first overall client accessing the API, wherein an output of the system logging is saved to the system monitoring file; and
   disabling the system logging when there is no session client currently accessing the API.

4. The method of claim 3, further comprising maintaining a reference count within the power management daemon, the reference count representing a number of session clients currently accessing the API, wherein the system logging is disabled when the reference count reaches a predetermined value.

5. The method of claim 4, further comprising:
   incrementing the reference count when an additional session client starts accessing the API; and
   decrementing the reference count when an existing session client stops accessing the API.

6. The method of claim 5, further comprising invoking an authentication framework to authenticate the session client based on one or more authentication policies to determine whether the session client is allowed to access the process activity status data, wherein the session client is allowed to access the process activity status data when the authentication framework successfully authenticates the session client.

7. A non-transitory computer readable storage medium including instructions that, when executed by a processing device, cause the processing device to perform a method comprising:
   retrieving, by a power management daemon, process activity status data from a system monitoring file stored within a data processing system, in response to a request received from a session client, the power management daemon being a system-wide component within the data processing system; and
   returning, by the power management daemon, the retrieved process activity status data to the client, wherein the system monitoring file requires a predetermined accessing privilege for accessing, and wherein the session client receives the process activity status data without having to satisfy the predetermined accessing privilege.

8. The non-transitory computer readable storage medium of claim 7, wherein the method further comprises:
   computing, by the power management daemon, process wakeup statistics based on the process activity status data, including a number of wakeup events within a predetermined period of time caused by one or more processes running within the data processing system; and
   returning the computed statistics to the client via an application programming interface (API).

9. The non-transitory computer readable storage medium of claim 8, wherein the method further comprises:
   enabling system logging performed by a system monitor of the data processing system in response to the request if the session client is the first overall client accessing the API, wherein an output of the system logging is saved to the system monitoring file; and
   disabling the system logging when there is no session client currently accessing the API.

10. The non-transitory computer readable storage medium of claim 9, wherein the method further comprises maintaining a reference count within the power management daemon, the reference count representing a number of session clients currently accessing the API, wherein the system logging is disabled when the reference count reaches a predetermined value.

11. The non-transitory computer readable storage medium of claim 10, wherein the method further comprises:
    incrementing the reference count when an additional session client starts accessing the API; and
    decrementing the reference count when an existing session client stops accessing the API.

12. The non-transitory computer readable storage medium of claim 11, wherein the method further comprises invoking an authentication framework to authenticate the session client based on one or more authentication policies to determine whether the session client is allowed to access the process activity status data, wherein the session client is allowed to access the process activity status data when the authentication framework successfully authenticates the session client.

13. A system comprising:
a processing device;
a memory coupled to the processing device; and
a power management daemon coupled to the processing device and the memory, the power management daemon configured to:
retrieve process activity status data from a system monitoring file stored within a data processing system, in response to a request received from a session client
return the retrieved process activity status data to the client, wherein the system monitoring file requires a predetermined accessing privilege for accessing, and wherein the session client receives the process activity status data without having to satisfy the predetermined accessing privilege.

14. The system of claim 13, further comprising:
a statistics calculator coupled to the power management daemon and an application programming interface (API) to compute process wakeup statistics based on the process activity status data, including a number of wakeup events within a predetermined period of time caused by one or more processes running within the data processing system; and
a repository coupled to the statistics calculator to store a copy of the process activity status data and the calculated statistics data, wherein the computed statistics is returned to the client via the API.

15. The system of claim 14, further comprising a communications interface coupled to the API to communicate with a system monitor to enable system logging of the data processing system in response to the request if the session client is the first overall client accessing the API, wherein an output of the system logging is saved to the system monitoring file, and to disable the system logging when there is no session client currently accessing the API.

16. The system of claim 15, further comprising a reference count representing a number of session clients currently accessing the API, wherein the system logging is disabled when the reference count reaches a predetermined value.

17. The system of claim 16, wherein the reference count is incremented when an additional session client starts accessing the API and the reference count is decremented when an existing session client stops accessing the API.

18. The system of claim 17, further comprising an authentication unit to authenticate the session client based on one or more authentication policies to determine whether the session client is allowed to access the process activity status data, wherein the session client is allowed to access the process activity status data when the session client is successfully authenticated.

* * * * *